Feb. 5, 1935.  H. T. KRAFT  1,990,455
VULCANIZING HEATER
Filed April 4, 1934  3 Sheets-Sheet 1

INVENTOR
Herman T. Kraft
BY
ATTORNEYS

Feb. 5, 1935.  H. T. KRAFT  1,990,455
VULCANIZING HEATER
Filed April 4, 1934   3 Sheets-Sheet 2

INVENTOR
Herman T. Kraft
BY
ATTORNEYS

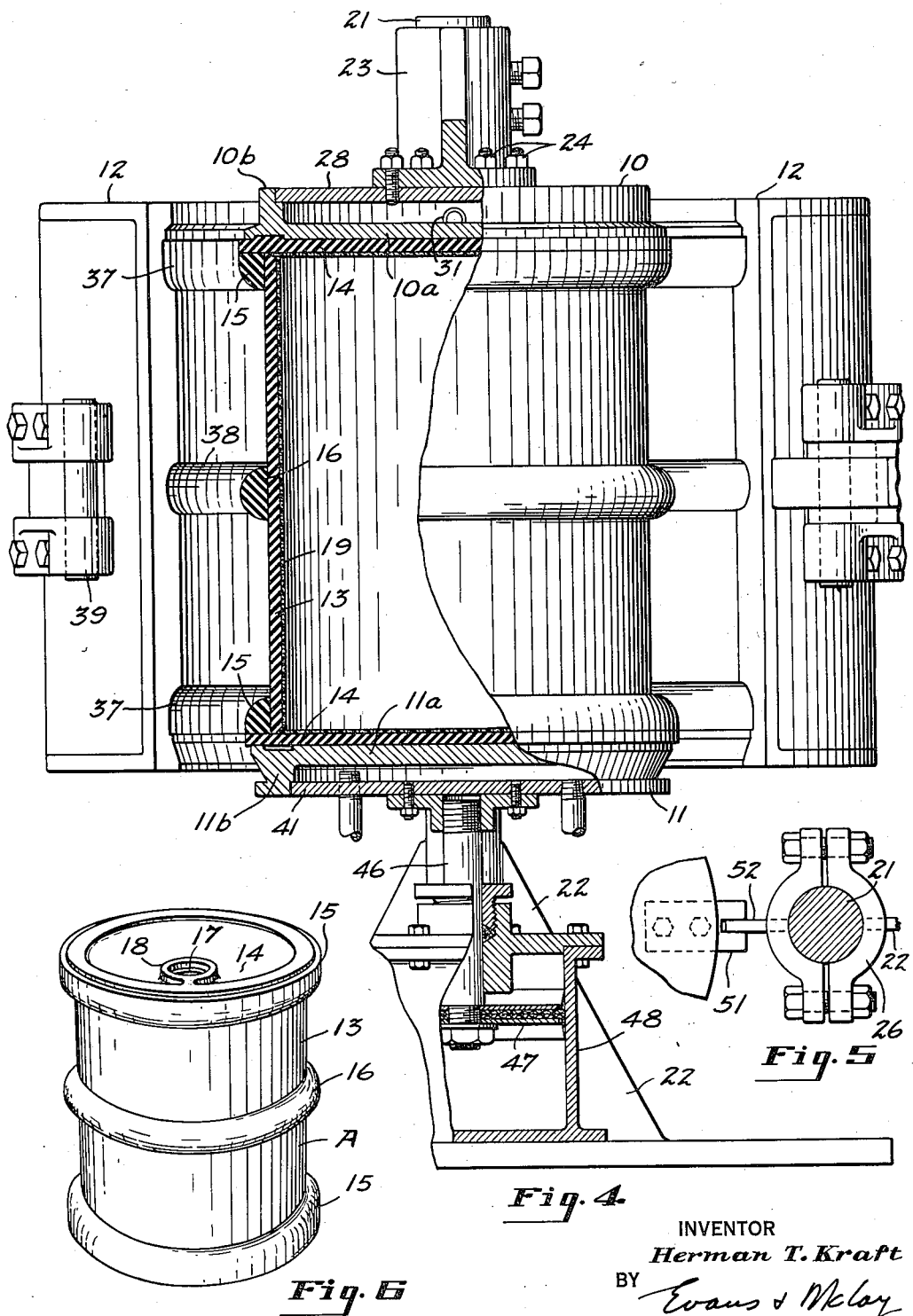

Patented Feb. 5, 1935

1,990,455

UNITED STATES PATENT OFFICE 1,990,455

VULCANIZING HEATER

Herman T. Kraft, Akron, Ohio, assignor to The General Tire & Rubber Company, Akron, Ohio, a corporation of Ohio Application April 4, 1934, Serial No. 718,974

12 Claims. (Cl. 18—17)

This invention relates to vulcanizing heaters and more particularly to vulcanizing heaters for use in producing containers of the character shown in my co-pending application Serial No. 705,525, filed January 6, 1934, and employing the method of vulcanizing containers described and claimed in said co-pending application.

The principal object of the present invention is to provide a vulcanizing heater of new and improved construction for use in the manufacture of cylindrical containers and in which means is provided for placing the container under axial compression during the vulcanizing operation.

With the above and other objects in view, which will be apparent from the following detailed description, the present invention consists of certain features of construction and combinations of parts to be hereinafter described with reference to the accompanying drawings, and then claimed.

In the drawings which illustrate a suitable embodiment of the invention,

Fig. 4 is a vertical section taken approximately on the line 4—4 of Fig. 1 with the wings in open position and with the parts in position prior to the compressing operation;

Fig. 5 is a section taken approximately on the line 5—5 of Fig. 1; and

Fig. 6 is a small perspective view of the vulcanized container.

Figure 1:
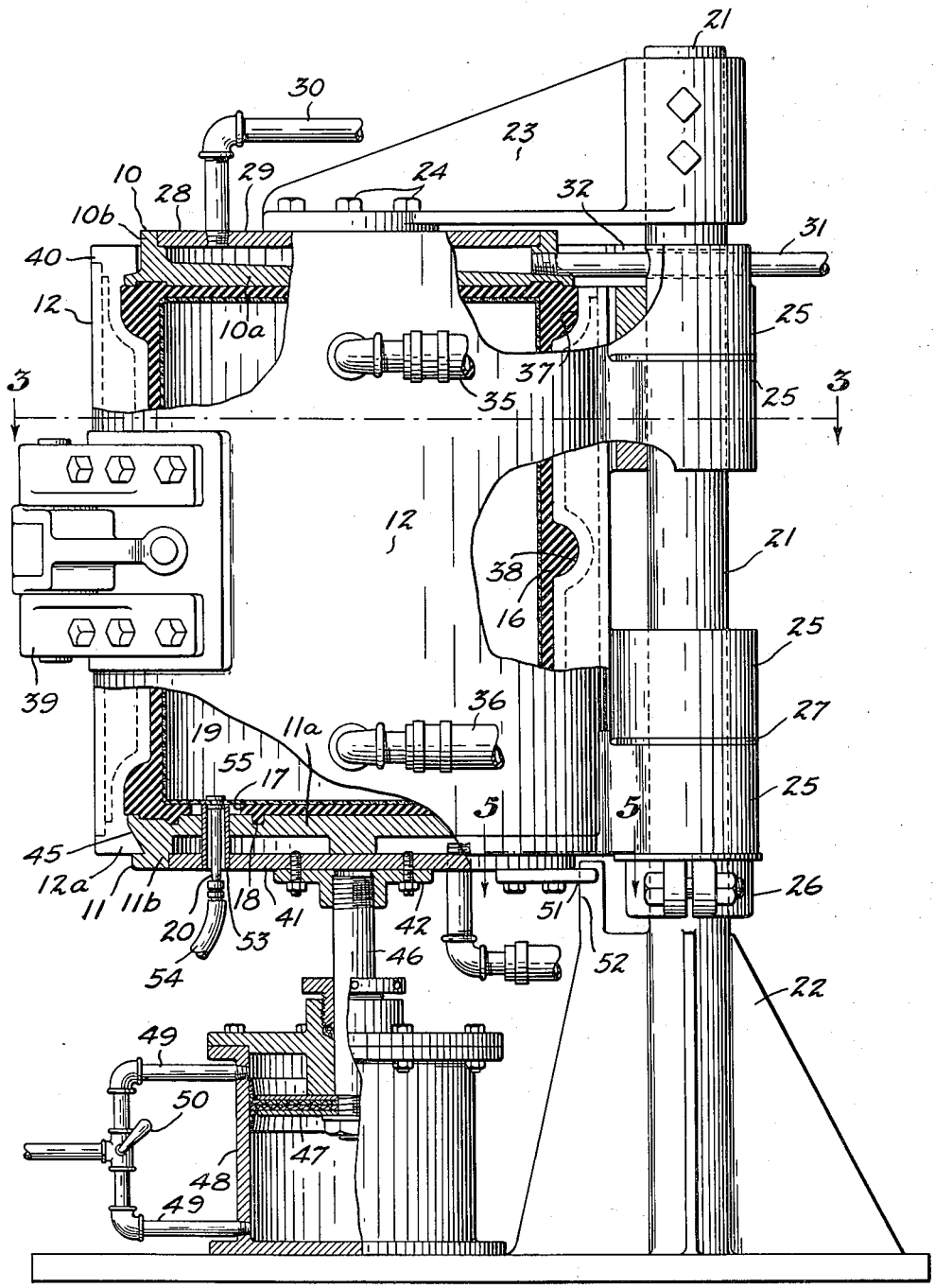
Figure 1 is a side elevation of the vulcanizing heater in its closed position, portions of the same being broken away and shown in section, and showing the container positioned therein.

Referring to the accompanying drawings, in which like numerals refer to like parts throughout the several views, the heater proper comprises an upper stationary mold part 10, a lower axially movable mold part 11 and a pair of swingable mold parts or wings 12, which are arranged to be clamped together to completely surround the member or container to be vulcanized.

For the purpose of illustration, I have shown in Fig. 6, the drum or container A disclosed in my said co-pending application Serial No. 705,525. This container comprises an annular body 13 having heads 14, chimes 15 at its ends and a chime 16 intermediate its ends. One of the heads 14 is provided with a filler opening 17 which is surrounded by an annular flange 18. The container is formed of a suitable vulcanizable fibrous material as described in my said co-pending application and is lined with a gum rubber lining 19. The container is built up of the three rubber lined parts, namely, the two heads 14 and annular body 14 and is assembled in the heater with the chimes 15 and 16 in position about the same. The rubber lining 19 extends across the filler opening 17, as indicated in Figure 1, and provided with a valve stem 20.

As indicated in Fig. 1, the container is vulcanized in an upright position with the head in which the filler opening 17 is formed, in the lowermost position. The upper part or section 10 and wings 12 are supported by a vertical column 21 which is supported in its upright position by a suitable base 22, the column 21 having a suitable overhanging bracket 23 to which the upper section 10 is rigidly secured by bolts or cap screws 24. The wings or hinged sections 12 are provided with hinge arms 25 journalled about the column 21, the column having a clamp 26 thereon for supporting the hinge arms 25. As shown in Figure 1, the hinge arms of the hinged sections 12 are separated by suitable bearing washers 27.

The upper mold section 10 may be constructed in any suitable manner but as here shown it comprises a main member 10a, the lower face of which is contoured to the shape of the bottom head 14 of the container to be vulcanized, and the upper face thereof being inclined from its front portion downwardly toward its rear portion to provide a drain surface. An annular, upwardly extending flange 10b is provided a short distance inwardly from the peripheral edge of the main member 10a and the upper inner edge thereof is rabbeted to provide a shoulder for the reception of a closure plate 28 which is welded around its edge to the flange 10b thereby providing a space 29 for the heating medium. The plate 28 carries an inlet conduit 30 for the space 29 and an outlet conduit 31 is also provided. The outlet conduit 31 extends through the flange 10b and also through the column 21 as shown in Fig. 1, the uppermost hinge arm 25 being recessed at 32 to permit this, and to permit swinging movement of the wing section.

The hinged sections 12 are semi-circular in cross section and each comprises a main member 12a having a continuous outwardly extending flange 12b which is rabbeted at its inner edge to receive a semi-circular closure plate 33 which is welded thereto and provides the space 34 for the heating medium which is admitted into the space through a flexible inlet conduit 35 and is drained from this space by a flexible outlet conduit 36. The inner faces of the main members 12a of the hinged sections are contoured to the shape of the external surface of the container and provided with recesses 37 and 38 for the chimes 15 and 16, respectively.

A toggle mechanism 39 is provided for locking the hinged sections together, which mechanism may be of any suitable construction.

A firm engagement between the hinged sections 12 and upper section 10 is provided by means of inclined wedging surfaces 40 formed at the outer peripheral edge of main member 10a and inner peripheral edge of main member 12a, as shown in Fig. 1.

The lower and movable section 11 is formed similar to the upper section 10 and comprises a main member 11a having a peripheral rabbeted flange 11b which carries a closure plate 41, which, together with the main member 11, provides the space 42 for the heating medium. The heating medium is admitted into and drained from this space through flexible inlet and discharge conduits 43 and 44, respectively.

Engagement between the lower section 11 and hinged sections 12 is provided by sharply inclined surfaces 45 which extend peripherally about the flange 11b of section 11 and the lower edges of the main members 12a of the hinged sections 12.

The lower section is vertically movable and is mounted on a central shaft or plunger rod 46 having a suitable plunger 47 on its lower end which is reciprocated by fluid pressure within a suitable pressure cylinder 48 mounted on the base 22. A suitable medium under pressure is admitted into the cylinder 48 at opposite sides of the plunger 47 through conduits 49 controlled by a valve 50.

In order to guide and prevent rotation of the lower section 11 during its movement, a slotted member 51 is secured thereto which interfits a vertical portion 52 of the base 22 with sliding engagement.

The lower section 11 is also provided with an annular member 53 extending therethrough, which allows the valve 20 to extend through the section so that a filler hose 54 may be connected to the same. A suitable collar 55 is also provided to fit within the opening 17 of the container.

Figure 2:
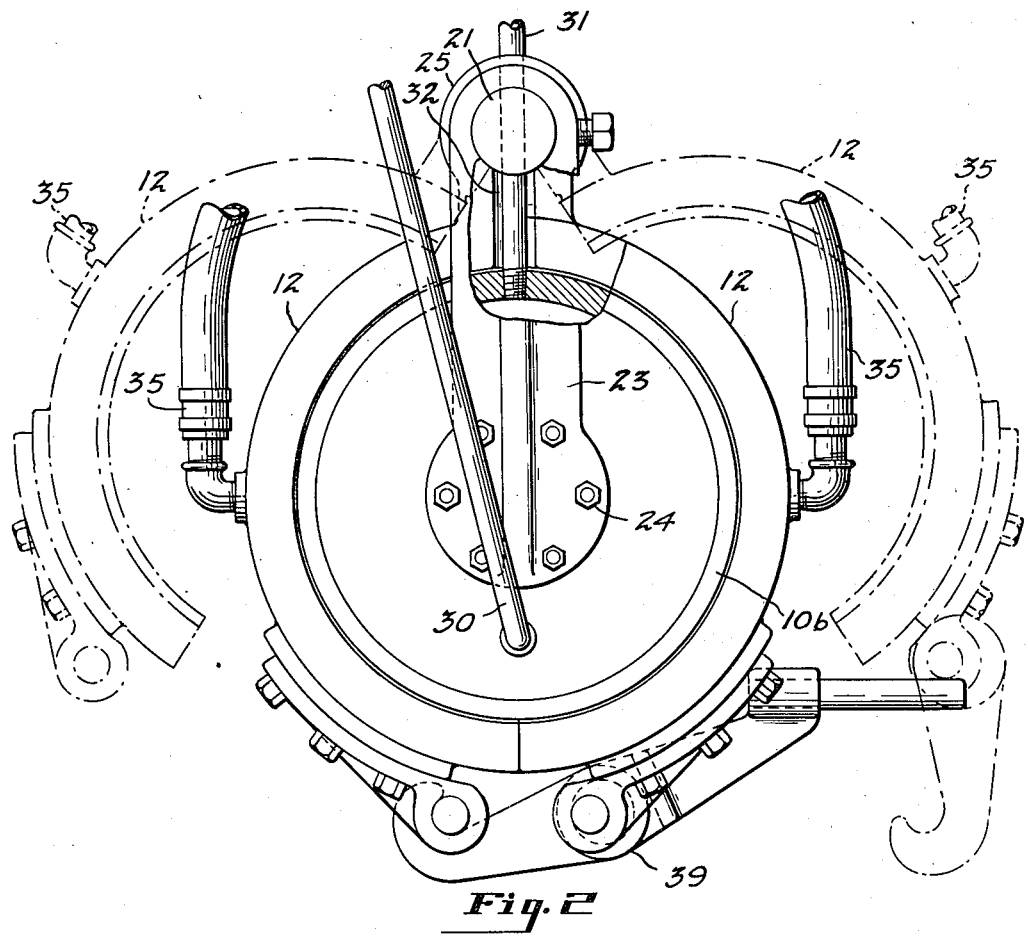
Fig. 2 is a top plan view of the vulcanizing heater, the open position of the same being shown in dotted outline.
Figure 3:
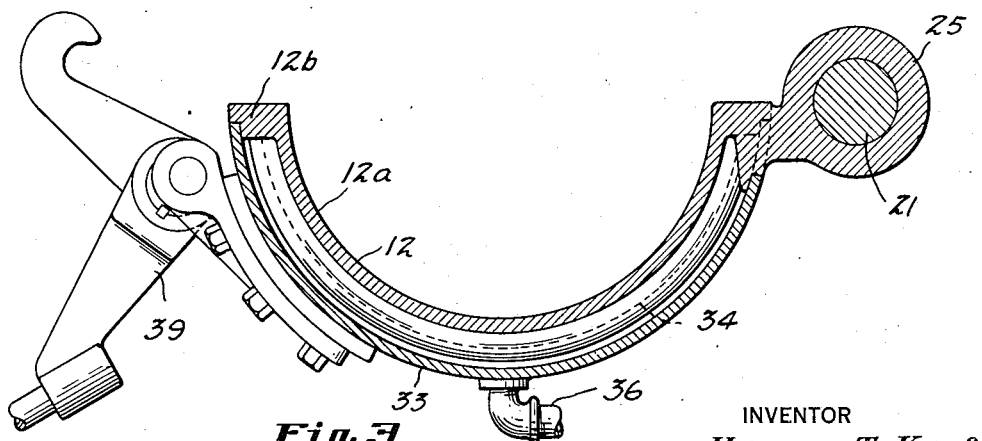
Fig. 3 is a transverse section of one of the swingable heater wings.

In the operation of the vulcanizing heater, the hinged sections 12 are swung open to the positions shown in Figs. 2 and 4 and the lower section 11 dropped to its lowest position, and the container is then positioned properly on the lower section. The container, however, at this time is composed of the body, heads and chimes seating against each other.

The lower section is then raised to bring the upper head, as seen in Fig. 4, into engagement with the upper section 10. It will be noted from Fig. 4 that at the time of this engagement, the lower section is not in its uppermost position and the container is of slightly greater length than the vulcanized container shown in the mold in Fig. 1. The lower section 11 is allowed to travel to its uppermost position and this causes the body of the container to be axially compressed and causing a firm engagement between the rubber lined heads and body of the container.

The hinged sections 12 are then swung toward each other and the toggle mechanism 39 operated to bring the sections 12 into firm abutting engagement. This causes the hinged sections to slightly circumferentially compress the container body and also provides a firm wedging engagement between the inclined surfaces 40 and between the inclined surfaces 45, thus confining the container within a completely sealed vulcanizing chamber.

After the toggle mechanism is locked, the hose or conduit 54 is attached to the filler valve 20 and the container is filled preferably with $CO_2$ gas to a suitable vulcanizing pressure. The heating medium is next permitted to pass into the heating chambers 29, 34 and 42 of the heater sections 10, 12 and 11, respectively.

After the vulcanizing operation is completed, the toggle mechanism 39 is unlocked, and fluid under pressure admitted to the upper side of the plunger 47, which causes the lower heater section to travel downwardly. This, by reason of the inclined surfaces 45, swings the hinged sections 12 outwardly, breaking them away from the vulcanized container.

The vulcanizing heater shown and described provides a very efficient means for producing one piece containers and drums of vulcanizable material and particularly one in which it is desired to axially compress the same prior to the vulcanizing operation.

Although several embodiments of the invention have been herein shown and described it will be understood that numerous details of the construction shown may be altered or omitted without departing from the spirit of this invention as defined in the following claims.

What I claim is:

1. A vulcanizing heater for vulcanizing hollow drumlike bodies, comprising a pair of heater sections for engaging the ends of the body to be vulcanized, means for moving one of said sections toward the other to axially compress the body to be vulcanized, a pair of movable heater sections for engaging the sides of the body, said movable sections having interlocking engagement with said first sections, and means for locking said movable sections together.

2. A vulcanizing heater for vulcanizing hollow drum-like bodies, comprising a pair of heater sections for engaging the ends of the body to be vulcanized, means for moving one of said sections toward the other to axially compress the body to be vulcanized, a pair of hinged heater sections for engaging the sides of the body, said hinged sections and first mentioned sections having interfitting sealed engagement with each other, and toggle means for locking said movable sections together.

3. A vulcanizing heater for vulcanizing hollow drum-like bodies, comprising a pair of heater sections for engaging the ends of the body to be vulcanized, means for moving one of said sections toward the other to axially compress the body to be vulcanized, a pair of hinged heater sections for engaging the sides of the body, said hinged sections and first mentioned sections having interfitting sealed engagement with each other, and toggle means for locking said movable sections together, said movable section having an undercut inclined peripheral surface and said hinged sections having inclined surfaces for engagement with said peripheral surface.

4. A vulcanizing heater for vulcanizing hollow drum-like bodies, comprising a pair of circular head sections for engaging the opposite heads of the body to be vulcanized, one of said sections being movable toward the other to axially compress the body, means for moving said movable section, a pair of hinged semi-circular sections for engaging the sides of the body and for firmly embracing said first mentioned sections, and means for locking said hinged sections together.

5. A vulcanizing heater for vulcanizing hollow drum-like bodies, comprising a pair of circular head sections for engaging the opposite heads of the body to be vulcanized, one of said sections being movable toward the other to axially compress the body, means for moving said movable section, a pair of hinged semi-circular sections for engaging the sides of the body and for firmly embracing said first mentioned sections, and means for locking said hinged sections together, each of said sections being hollow for receiving a heating medium.

6. A vulcanizing heater for vulcanizing hollow drum-like bodies, comprising a pair of circular head sections for engaging the opposite heads of the body to be vulcanized, one of said sections being movable toward the other to axially compress the body, fluid pressure means for moving said movable section, a pair of hinged semi-circular sections for engaging the sides of the body and for firmly embracing said first mentioned sections, and means for locking said hinged sections together.

7. A vulcanizing heater for vulcanizing hollow drum-like bodies, comprising a pair of circular head sections for engaging the opposite heads of the body to be vulcanized, one of said sections being movable toward the other to axially compress the body, means for moving said movable section, a pair of hinged semi-circular sections for engaging the sides of the body and for firmly embracing said first mentioned sections, and means for locking said hinged sections together, said movable section having an undercut inclined peripheral surface and each of said hinged sections having an inclined surface for sealed engagement with said peripheral surface.

8. A vulcanizing heater for vulcanizing hollow drum-like bodies, comprising a pair of circular head sections for engaging the opposite heads of the body to be vulcanized, one of said sections being movable toward the other to axially compress the body, means for moving said movable section, a pair of hinged semi-circular sections for engaging the sides of the body and for firmly embracing said first mentioned sections, and means for locking said hinged sections together, said movable section having an undercut inclined peripheral surface and each of said hinged sections having an inclined surface for sealed engagement with said peripheral surface, the other of said first mentioned sections and said hinged sections also having peripheral inclined surfaces for sealed engagement with each other.

9. A vulcanizing heater for vulcanizing hollow drum-like bodies, comprising a vertical standard, a stationary heater section supported by said standard, a pair of hinged sections swingably mounted on said standard, a movable section in axial alignment with said first mentioned section for axially compressing the body to be vulcanized, fluid pressure means for moving said movable section, said hinged sections being engageable with said other sections to form a vulcanizing chamber and for confining the body therein, and means for locking said hinged sections together about said other sections.

10. A vulcanizing heater for vulcanizing hollow drum-like bodies, comprising a vertical standard, a stationary heater section supported by said standard, a pair of hinged sections swingably mounted on said standard, a movable section in axial alignment with said first mentioned section for axially compressing the body to be vulcanized, fluid pressure means for moving said movable section, said hinged sections being engageable with said other sections to form a vulcanizing chamber and for confining the body therein, and means for locking said hinged sections together about said other sections, each of said sections having a closed chamber therein for receiving a heating medium.

11. A vulcanizing heater for vulcanizing hollow drum-like bodies, comprising a vertical standard, a stationary heater section supported by said standard, a pair of hinged sections swingably mounted on said standard, a movable section in axial alignment with said first mentioned section for axially compressing the body to be vulcanized, fluid pressure means for moving said movable section, said hinged sections being engageable with said other sections to form a vulcanizing chamber and for confining the body therein, means for locking said hinged sections together about said other sections, and means for guiding said movable section and holding the same against rotational movement.

12. A vulcanizing heater for vulcanizing hollow drum-like bodies, comprising a pair of circular head sections for engaging the opposite heads of the body to be vulcanized, one of said sections being movable toward the other to axially compress the body, means for moving said movable section, a pair of hinged semi-circular sections for engaging the sides of the body and for firmly embracing said first mentioned sections, and means for locking said hinged sections together, and means for guiding said movable section and holding the same against rotational movement.

HERMAN T. KRAFT.